United States Patent
Rowe et al.

(10) Patent No.: US 9,341,076 B2
(45) Date of Patent: May 17, 2016

(54) SURGE MARGIN CONTROL

(75) Inventors: Arthur L. Rowe, Derby (GB);
Christopher Redfern, Nottingham (GB)

(73) Assignee: ROLLS-ROYCE plc, London (GB)

( * ) Notice: Subject to any disclaimer, the term of this patent is extended or adjusted under 35 U.S.C. 154(b) by 939 days.

(21) Appl. No.: 13/493,433

(22) Filed: Jun. 11, 2012

(65) Prior Publication Data
US 2012/0317955 A1    Dec. 20, 2012

(30) Foreign Application Priority Data
Jun. 16, 2011  (GB) .................................. 1110116.9

(51) Int. Cl.
*F01D 21/06*      (2006.01)
*F01D 17/16*      (2006.01)

(52) U.S. Cl.
CPC .............. *F01D 21/06* (2013.01); *F01D 17/162* (2013.01); *F05D 2270/09* (2013.01); *F05D 2270/095* (2013.01); *F05D 2270/101* (2013.01)

(58) Field of Classification Search
CPC .......... F02C 9/28; F01D 17/162; F01D 21/06
USPC .............................................. 60/39.091, 779
See application file for complete search history.

(56) References Cited

U.S. PATENT DOCUMENTS

| 4,928,482 A | * | 5/1990 | Pollak ........................ F02C 9/28 60/39.27 |
| 6,164,902 A | | 12/2000 | Irwin et al. |
| 7,036,318 B1 | * | 5/2006 | Munson, Jr. .................... 60/776 |
| 2008/0178603 A1 | | 7/2008 | Mons |
| 2009/0123269 A1 | | 5/2009 | Bart et al. |
| 2010/0274416 A1 | * | 10/2010 | Poisson ............................ 701/3 |
| 2013/0133333 A1 | * | 5/2013 | Bacic ............................. 60/779 |

FOREIGN PATENT DOCUMENTS

GB     2 230 822 A    10/1990

OTHER PUBLICATIONS

Search Report issued in British Patent Application No. GB 1110116.9 dated Sep. 21, 2011.

* cited by examiner

*Primary Examiner* — Craig Kim
(74) *Attorney, Agent, or Firm* — Oliff PLC

(57) ABSTRACT

A gas turbine engine control system comprising a variable stator vane schedule for normal operation of the gas turbine engine. The system is configured to generate an arm signal indicating potential shaft break. Then the system is configured to alter the variable stator vane schedule to slew each variable stator vane to decrease the available surge margin in response to the arm signal. Or the system is configured to limit a response rate of a variable stator vane actuator in response to the arm signal. Or the system is configured to alter the variable stator vane schedule and limit the response rate of the actuator.

20 Claims, 3 Drawing Sheets

SURGE MARGIN CONTROL

Figure 1:
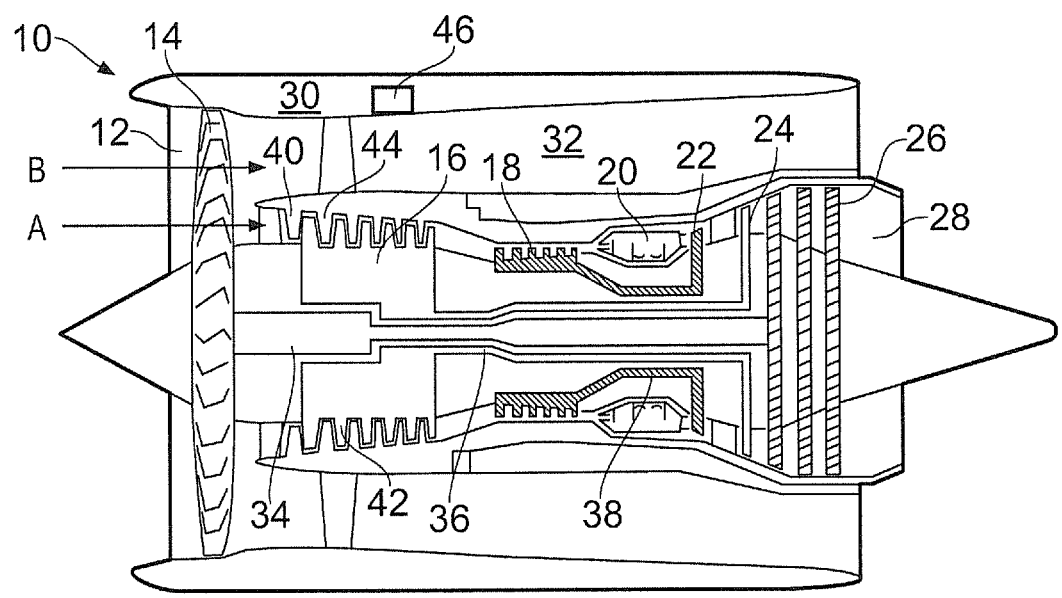

The present invention relates to surge margin control in a gas turbine engine. It is particularly concerned with decreasing the available surge margin and reducing the likelihood of recovery from surge in the event of a suspected shaft break.

It is an object of the present invention to provide a gas turbine engine control system that is configured to increase the likelihood of surge and/or decrease the likelihood of recovery from surge in the event that a shaft of the gas turbine engine breaks so that the energy is quickly and safely dissipated.

Accordingly the present invention provides a gas turbine engine control system comprising a variable stator vane schedule for normal operation of the gas turbine engine, the system is configured to: generate an arm signal indicating potential shaft break; and alter the variable stator vane schedule to slew each variable stator vane to decrease the available surge margin in response to the arm signal. Advantageously the control system of the present invention promotes the likelihood of engine surge in the event of a shaft break and thereby enables the engine to dissipate energy.

The gas turbine engine control system may be further configured to limit a response rate of a variable stator vane actuator in response to the arm signal. Advantageously this acts to prevent recovery from surge in the event of a shaft break.

The present invention also provides a gas turbine engine control system that is configured to: generate an arm signal indicating potential shaft break; and limit a response rate of a variable stator vane actuator in response to the arm signal. Advantageously the control system of the present invention acts to prevent recovery from surge in the event of a shaft break.

The gas turbine engine control system may be further configured to alter a variable stator vane schedule to slew each variable stator vane to decrease the available surge margin in response to the arm signal. Advantageously this promotes the likelihood of engine surge in the event of a shaft break.

The variable stator vanes may each be slewed by 5°. Alternatively the variable stator vanes may each be slewed by an angle that is dependent on engine power, for example the angle may be proportional or inversely proportional to the engine power.

The variable stator vanes may each be slewed by an angle dependent on an environmental operating condition experienced by the gas turbine engine, for example the slew angle may be different at low temperature and high altitude conditions than at high temperature and low altitude conditions.

The gas turbine engine control system may be further configured to: generate a shaft failure signal in response to a shaft failure indication; and command gas turbine engine shut down in response to the shaft failure signal. The engine shut down command may comprise a command to close a fuel shut-off valve, such as a high speed fuel shut-off valve. Alternatively the engine shut down command may comprise a command to slew closed a fuel metering valve to choke the fuel supply to the gas turbine engine.

The arm signal may comprise one of the group comprising an air system temperature, a rate of increase of an air system temperature and a bleed valve actuation failure. Alternatively the loss of signal from speed probes may be used to trigger the arm signal.

The present invention also provides a gas turbine engine comprising a gas turbine engine control system as described having some, any or all of the optional features.

Figure 2:
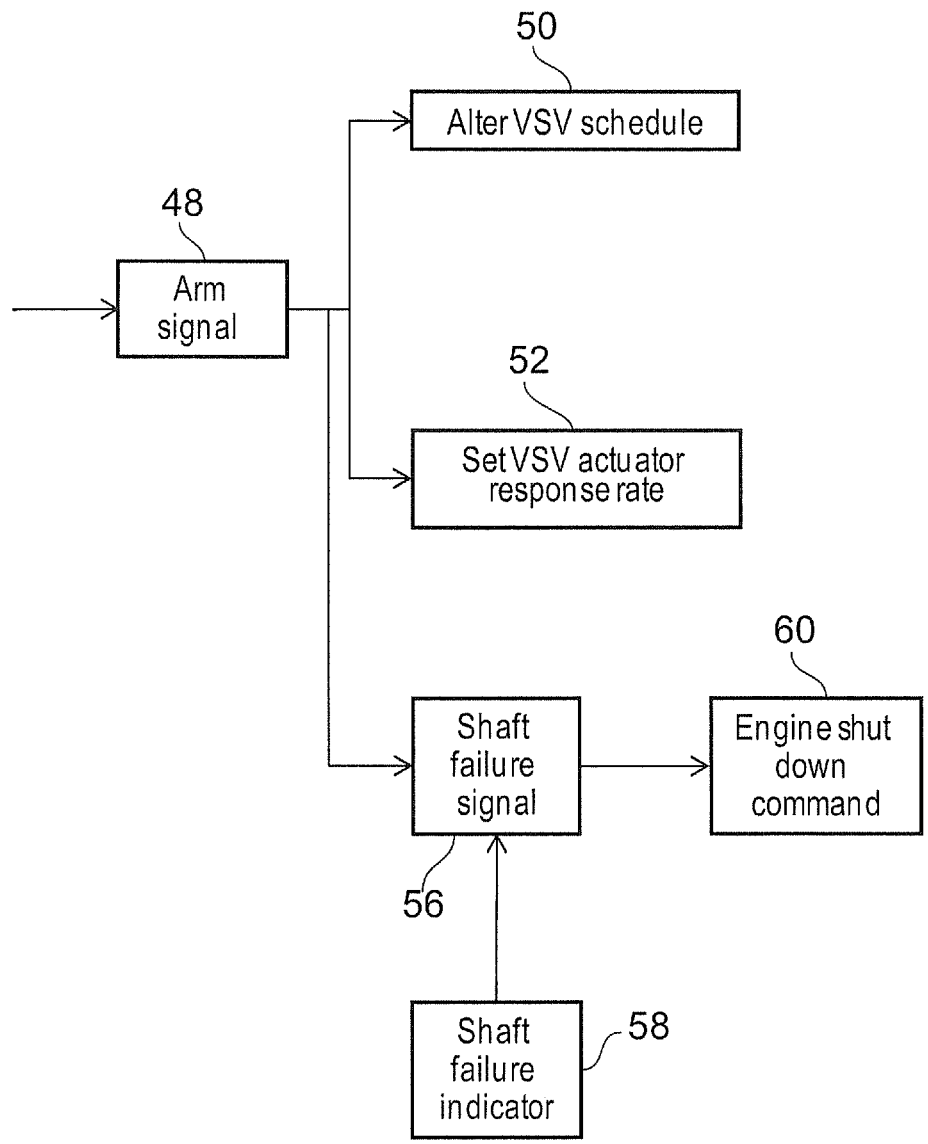
Figure 3:
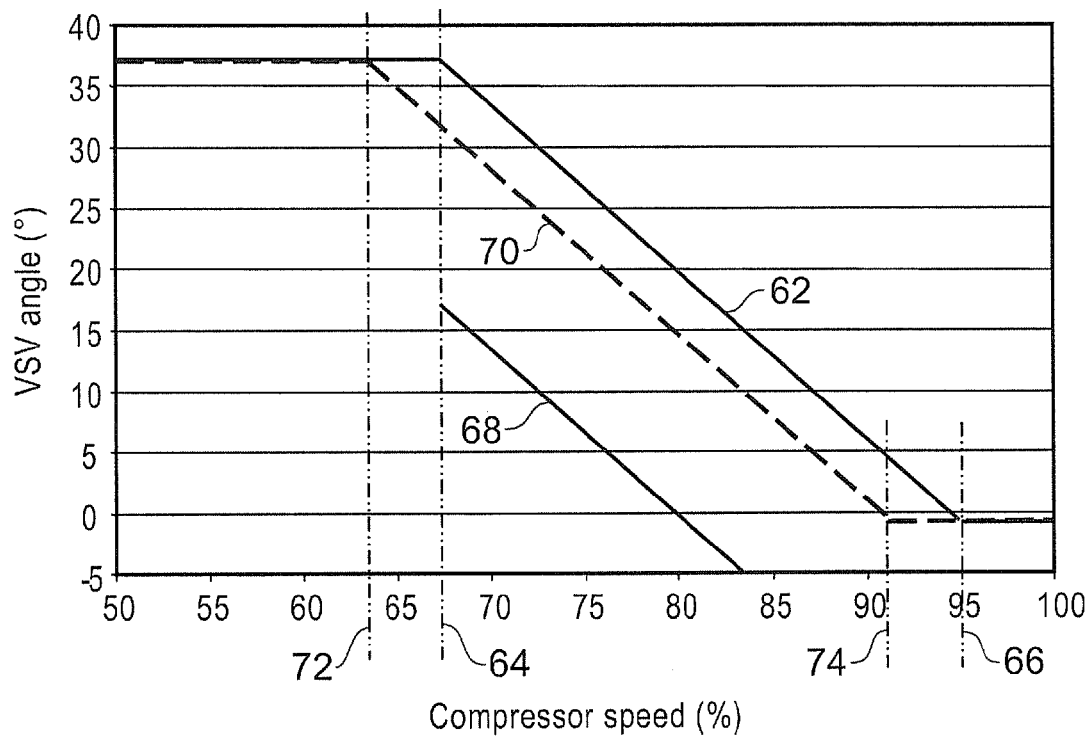
Figure 4:
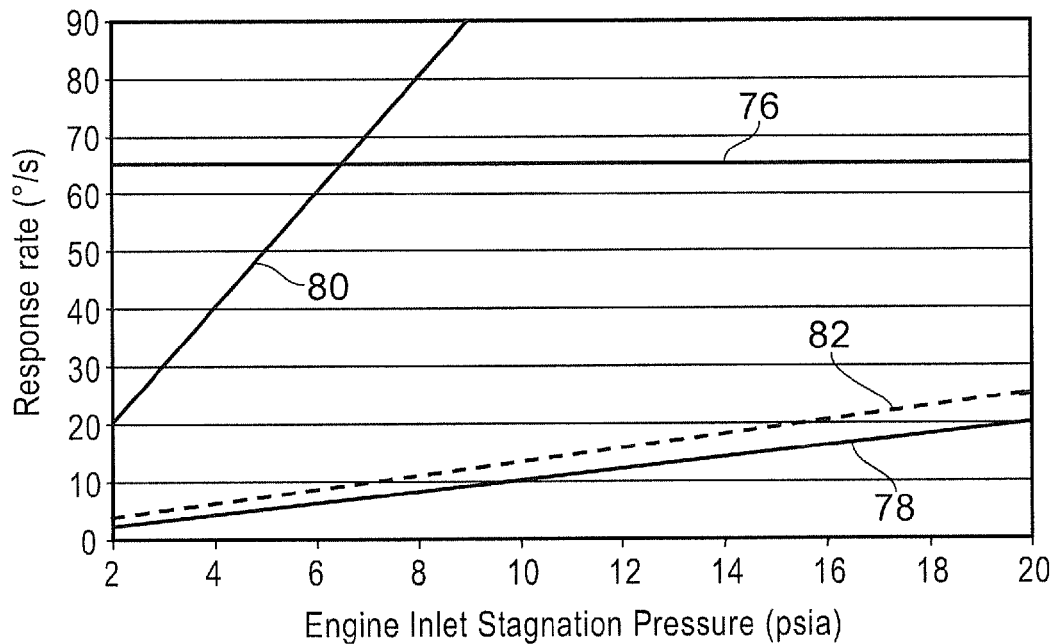

The present invention will be more fully described by way of example with reference to the accompanying drawings, in which:

FIG. 1 is a sectional side view of a gas turbine engine.
FIG. 2 is a schematic diagram of a control system according to the present invention.
FIG. 3 is a graph showing a variable stator vane schedule.
FIG. 4 is a graph showing a variable stator vane actuator response rate schedule.

A gas turbine engine 10 is shown in FIG. 1 and comprises an air intake 12 and a propulsive fan 14 that generates two airflows A and B. The gas turbine engine 10 comprises, in axial flow A, an array of inlet guide vanes 40, an intermediate pressure compressor 16 comprising annular arrays of rotor blades 42 interleaved with annular arrays of stator vanes 44, a high pressure compressor 18, a combustor 20, a high pressure turbine 22, an intermediate pressure turbine 24, a low pressure turbine 26 and an exhaust nozzle 28. The high pressure compressor 18 and the turbines 22, 24, 26 may similarly comprise interleaved stages of annular rotors and stator vanes. The inlet guide vanes 40 and some or all stages of stator vanes 44 may comprise variable geometry so that their angle relative to the engine axis may be varied by one or more actuators (not shown); they are then referred to as variable inlet guide vanes 40 and variable stator vanes 44 respectively. The fan 14 is coupled to the low pressure turbine 26 by a low pressure shaft 34. The intermediate pressure compressor 16 is coupled to the intermediate pressure turbine 24 by an intermediate pressure shaft 36. The high pressure compressor 18 is coupled to the high pressure turbine 22 by a high pressure shaft 38.

A nacelle 30 surrounds the gas turbine engine 10 and defines, in axial flow B, a bypass duct 32. A control system 46, such as an electronic engine controller (EEC), is provided on the engine 10 and is configured to control aspects of the operation of the engine 10.

In rare circumstances one of the shafts 34, 36, 38 may break. When this occurs the fan 14 or compressor 16, 18 decelerates rapidly because it is no longer driven. However, the turbine 22, 24, 26 rapidly accelerates because the load on it is substantially reduced. This in turn may cause the turbine disc to burst releasing high energy debris and resulting in catastrophic failure of the engine 10. Where the engine 10 is used to power an aircraft the released high energy debris may not be captured and there is thus a risk of some debris impacting or piercing the fuselage of the aircraft. Therefore there is a need to identify shaft breakages and to shut down the engine 10 quickly by shutting off the fuel supply. Typically a shaft break event must be controlled in less than 1 second or the release of high energy debris cannot be reliably prevented.

Aspects of the present invention are described with respect to FIG. 2. The control system 46 is configured to generate an arm signal 48 that indicates the potential that a shaft break will occur. The arm signal 48 may be generated in response to an indication of an internal fire that may threaten the integrity of the shaft such as an air system temperature above a predetermined threshold, a rate of temperature increase greater than a predetermined threshold rate, or a combination of these; or a bleed valve actuation failure or other mechanical failure that is likely to subsequently cause a shaft break. Other indicators of an increased probability of shaft break may be used to trigger the control system 46 to generate the arm signal 48 as most appropriate in the particular application contemplated. In response to the generated arm signal 48 one or both of the following actions are triggered. A variable stator vane schedule may be altered as indicated at box 50 and described in more detail with respect to FIG. 3. Additionally or alternatively the response rate of one or more variable stator vane actuators may be reduced as indicated at box 52 and described in more detail with respect to FIG. 4.

Only once the arm signal 48 has been generated may a shaft failure signal 56 be generated by the control system 46. This reduces the likelihood of a spurious shaft failure being indicated since the control system 46 must first be armed by the arm signal 48. The shaft failure signal 56 is generated in response to a shaft failure indicator 58. The shaft failure indicator 58 may be a decrease in compressor speed at a rate quicker than a predetermined threshold. Alternatively, it may be a difference between compressor and turbine speed greater than a predetermined threshold or any other known method of determining shaft failure. The shaft failure indicator 58 may be mechanical, electrical or electronic as is well known in the art.

When the control system 46 generates a shaft failure signal 56 it immediately generates an engine shut down command 60. The engine shut-down command 60 may command a fuel shut-off valve, preferably a high-speed fuel shut-off valve, to close thereby removing the fuel supply to the gas turbine engine 10 and causing it to shut down. Alternatively the engine shut down command 60 may command a fuel metering valve to slew closed to choke the fuel supply to the engine 10 and cause it to shut down.

The combination of shutting down the engine 10 in response to the engine shut down command 60 and either or both of altering the variable stator vane schedule 50 and altering the variable stator vane actuator response rate results in the gas turbine engine 10 surging as well as shutting down. Beneficially therefore energy is dissipated by surge so that the risk of release of high energy debris is mitigated or at least substantially reduced.

FIG. 3 is a graph plotting variable stator vane angle in degrees against compressor speed expressed as a percentage of maximum speed. An exemplary nominal variable stator vane schedule 62 is illustrated for the intermediate pressure compressor 16. The angle of the variable stator vanes 44 is limited to a predefined maximum angle up to a lower limit 64 of compressor speed. As illustrated, the angle is limited to around 37° for compressor speeds up to 67% of maximum. Similarly the angle of the variable stator vanes 44 is limited to a predefined minimum angle from an upper limit 66 of compressor speed, −1° for compressor speeds above 95% of maximum as illustrated. Between the lower and upper limit speed limits 64, 66 the variable stator vane angle follows a straight line relationship.

The angle of each variable stator vane 44 is 0° when aligned at the design point, typically around 20° away from axial in the direction of rotation of the following rotor stage. The angle increases as each variable stator vane 44 is angled further away from axial in the direction of rotation of the following stage.

Line 68 indicates a threshold between conditions where the engine 10 surges and conditions where there is surge margin available. When the engine 10 operates in the region to the left of line 68, the compressor 16 will surge. In normal operating conditions, when the variable stator vanes 44 are scheduled according to the nominal schedule 62, the distance between the nominal schedule 62 and the line 68 represents the surge margin available to the engine 10. As is understood by those skilled in the art, surge margin is necessary to ensure the engine 10 does not surge when gusts or other vagaries of the air flow enter the air intake 12.

The control system 46 of the present invention acts to alter the variable stator vane schedule, box 50, when the arm signal 48 has been generated in response to an increased vulnerability to shaft breakage. An exemplary altered variable stator vane schedule 70 is illustrated in FIG. 3 in dashed lines. The altered schedule 70 maintains the maximum and minimum angles but reduces the lower speed limit 72, to 64% as illustrated, and the upper speed limit 74, to 92% as illustrated. The linear relationship of angle to compressor speed between the upper and lower speed limits 72, 74 is maintained so that this portion of the altered schedule 70 is shifted left relative to the nominal schedule 62. In the exemplary altered schedule 70 the alteration has the effect of opening the variable stator vanes 44 by 5° more than nominal at any given compressor speed. Thus at a compressor speed of 67% the variable stator vanes 44 are set at an angle of 37° when operated on the nominal schedule 62 and at an angle of 32° when operated on the altered schedule 70.

The result of altering the variable stator vane schedule is that the available surge margin is reduced. This means that the engine 10 is more likely to surge and in particular means that the engine 10 will be forced to surge more quickly in the event of a shaft break event. Advantageously, surge rapidly dissipates energy and therefore makes the release of high energy debris less likely. The engine 10 is forced into surge whilst the shaft failure signal 56 is generated and the engine shut down command 60 generated and implemented.

FIG. 4 is a graph plotting variable stator vane actuator response rate in degrees per second against engine inlet stagnation pressure in pounds per square inch absolute (psis). A variable stator vane actuator has a maximum achievable response rate indicated by line 76. An exemplary actuator has a maximum response rate of 65°/s. During normal engine deceleration transients, as in other phases of normal engine operation, the variable stator vanes 44 are scheduled against compressor speed as shown in FIG. 3 which results in an apparent response rate schedule 78 for the variable stator vane actuator.

Schedule 80 illustrates a typical response rate required by the variable stator vane actuator in order to track the variable stator vane schedule 62 during the rapid deceleration of the compressor 16 resulting from a shaft break event. As is apparent from FIG. 4, if such a shaft break event occurs at low engine inlet pressures the gas turbine engine control system 46 is able to change the angle of the variable stator vanes 44 quickly enough to maintain some surge margin and thereby prevent surge. Detrimentally, the engine 10 cannot therefore dissipate energy and the potential for release of high-energy debris is increased. At around 6.5 psia as illustrated the physical limit of the actuator is reached, response rate 76. However, around this point the actuator is nearly able to track the required response rate and therefore may mainly suppress surge. At higher inlet pressures the gas turbine engine control system 46 is unable to track the shaft break event and the engine 10 will therefore surge, dissipating energy.

The present invention imposes a variable stator vane actuator response rate schedule 82 in response to the arm signal 48, as indicated at box 52. The response rate schedule 82 is set quicker than normal deceleration schedule 78 for all engine inlet pressures, but is significantly below the maximum physical response rate 76 of the actuator or the required response rate 80 to track a shaft break event. Beneficially, this means that in the event of a shaft break event the variable stator vane actuator cannot respond quickly enough to either prevent the engine 10 from surging or to recover it from a surge condition. Thus the energy generated from the shaft break event is at least partially dissipated by the surge whilst the shaft break indicator 58 triggers generation of the shaft failure signal 56 and the consequent engine shut down command 60.

There are benefits to each of the actions triggered by generation of the arm signal 48. However it is particularly beneficial to implement both actions in the gas turbine engine control system 46. In some circumstances the benefits derived from the altered variable stator vane schedule 70 may be negated by a variable stator vane actuator response rate that has not been limited to schedule 82 because the actuator would response quickly enough to control the surge caused by the altered variable stator vane schedule 70.

Although a variable stator vane actuator has been discussed, it should be understood that there may be more than one actuator for each stage of variable stator vanes 44. Similarly more than one stage of variable stator vanes 44, or a stage of variable inlet guide vanes 40 and one or more stages of variable stator vanes 44, may be controlled by the control system 46 of the present invention, via one or more variable stator vane actuators. The stages may be controlled identically, by being ganged together to one or more actuators or merely receiving the same commands to separate actuators, or may be controlled separately to the same or different schedules. It may be beneficial to operate different control schedules for different variable stator vane stages, or to bias the gang mechanism to have the same effect as different control schedules, due to the differences in aerodynamics and shapes between the stages.

Although the present invention has been described with respect to specific examples it will be understood that alternative schedules for variable stator vane angle and actuator response rate may be substituted with equal felicity. In particular the schedules may vary for different compressors of a gas turbine engine 10, for compressors of a two-shaft gas turbine engine compared to a three-shaft gas turbine engine, and for different stages of variable stator vanes 44 within a given compressor. The precise schedules required are a matter of good design or trial and error within the compass of the skilled reader.

The altered variable stator vane schedule 70 may be linear between its maximum and minimum angles or may be non-linear. Preferably it is parallel to the line 68, which may be linear or non-linear and may itself be parallel or non-parallel to the nominal variable stator vane schedule 62.

The present invention has been envisaged for use in a gas turbine engine 10 for propelling an aircraft since the effects of shaft breakage are potentially catastrophic. However, the present invention also has utility for other types of gas turbine engine 10 including for marine applications and for industrial applications such as gas and oil pumping engines.

The invention claimed is:

1. A gas turbine engine control system comprising:
   a nominal variable stator vane schedule for normal operation of the gas turbine engine, and an altered variable stator vane schedule for decreasing the available surge margin of the gas turbine engine, the system is configured to:
   generate an arm signal indicating potential shaft break; and
   switch from the nominal variable stator vane schedule to the altered variable stator vane schedule to slew each variable stator vane to decrease the available surge margin in response to the arm signal.

2. The gas turbine engine control system as claimed in claim 1, further configured to limit a response rate of a variable stator vane actuator in response to the arm signal.

3. The gas turbine engine control system as claimed in claim 1, wherein the variable stator vanes are each slewed by 5°.

4. The gas turbine engine control system as claimed in claim 1, wherein the variable stator vanes are each slewed by an angle dependent on engine power.

5. The gas turbine engine control system as claimed in claim 1, wherein the variable stator vanes are each slewed by an angle dependent on an environmental operating condition experienced by the gas turbine engine.

6. The gas turbine engine control system as claimed in claim 1, further configured to:
   generate a shaft failure signal in response to a shaft failure indicator; and
   command gas turbine engine shut down in response to the shaft failure signal.

7. The gas turbine engine control system as claimed in claim 6, wherein the command to shut down the gas turbine engine comprises a command to close a fuel shut-off valve.

8. The gas turbine engine control system as claimed in claim 6, wherein the command to shut down the gas turbine engine comprises a command to slew closed a fuel metering valve.

9. The gas turbine engine control system as claimed in claim 6, wherein the arm signal comprises one of the group comprising an air system temperature, a rate of increase of an air system temperature and a bleed valve actuation failure.

10. A gas turbine engine comprising a gas turbine engine control system as claimed in claim 1.

11. A gas turbine engine control system that is configured to:
   generate an arm signal indicating potential shaft break; and
   limit a response rate of a variable stator vane actuator by shifting from a normal deceleration schedule to a variable stator vane actuator response rate schedule in response to the arm signal.

12. The gas turbine engine control system as claimed in claim 11, further configured to alter a variable stator vane schedule to slew each variable stator vane to decrease the available surge margin in response to the arm signal.

13. The gas turbine engine control system as claimed in claim 12, wherein the variable stator vanes are each slewed by 5°.

14. The gas turbine engine control system as claimed in claim 12, wherein the variable stator vanes are each slewed by an angle dependent on engine power.

15. The gas turbine engine control system as claimed in claim 12, wherein the variable stator vanes are each slewed by an angle dependent on an environmental operating condition experienced by the gas turbine engine.

16. The gas turbine engine control system as claimed in claim 11, further configured to:
   generate a shaft failure signal in response to a shaft failure indicator; and
   command gas turbine engine shut down in response to the shaft failure signal.

17. The gas turbine engine control system as claimed in claim 16, wherein the command to shut down the gas turbine engine comprises a command to close a fuel shut-off valve.

18. The gas turbine engine control system as claimed in claim 16, wherein the command to shut down the gas turbine engine comprises a command to slew closed a fuel metering valve.

19. The gas turbine engine control system as claimed in claim 16, wherein the arm signal includes one of the group comprising an air system temperature, a rate of increase of an air system temperature and a bleed valve actuation failure.

20. A gas turbine engine comprising a gas turbine engine control system as claimed in claim 11.

* * * * *